UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

THERMO-ELECTRIC COUPLE.

1,079,621.        Specification of Letters Patent.        Patented Nov. 25, 1913.

No Drawing.        Application filed October 27, 1909. Serial No. 524,945.

*To all whom it may concern:*

Be it known that I, EZECHIEL WEINTRAUB, a citizen of the United States, residing at Lynn, county of Essex, State of Massachusetts, have invented certain new and useful Improvements in Thermo-Electric Couples, of which the following is a specification.

My present invention comprises an improved electric couple, suitable for use as a source of current, or for other purposes, and including as a part thereof an element consisting wholly or in part of boron.

Moissan and other chemists describe boron to be a brownish powder, practically non-conductive for electricity, and vaporizable without fusion. After a long research I have found that pure boron is a fair conductor of electricity, can be fused to a dense body, and has a negative temperature resistance coefficient of a magnitude without precedent among chemical elements. I have also discovered that boron is well adapted for use as an element in a thermo-electric couple. For this purpose the boron need not be chemically pure, but may have associated with it carbon, silicon, magnesium, aluminum or other material capable of lowering its specific resistance without materially changing its thermo-electric power.

Conductors of boron, or of boron associated with carbon suitable for use according to the present invention, may be made by reducing boron chlorid with hydrogen in the presence of a high voltage alternating current arc maintained between water-cooled copper electrodes. The method and apparatus for carrying out this operation are fully described by me in my co-pending application, Serial No. 524,939 of even date. In such an apparatus some of the reduced boron fuses on the electrodes and grows into beads and rods. In this form it can be used directly as an element of the thermo-couple. Some of the reduced pure boron is thrown out on the walls of the arc chamber in a finely divided condition. This powder is pressed into sticks, either with or without the addition of carbon, or other material, and subsequently fused by being made the electrode of a high potential arc operating in hydrogen. This latter process is fully described by me in my co-pending application, Serial No. 924,947 of even date. The sticks can also be fused to a dense body in a mercury-vapor arc.

According to another method of manufacture, the thermo-electric element composed of boron, or of boron associated with another material, suitable for use in a thermo couple, can be made by reducing an excess of boric anhydrid with magnesium. The resulting product consists of magnesium borid and boron suboxid, and can be made to yield fused, substantially pure boron by pressing it into a stick, preheating it in a vacuum furnace to drive out some of the impurities and make it partially conductive, and then heating the stick as an electrode for a high potential alternating current arc operating in hydrogen at a pressure of about five inches of mercury, or by heating it in a mercury-vapor arc. This treatment will drive out most of the magnesium or oxygen, and if carried to a sufficient temperature will sinter the boron into a dense body. If carbon, or other element is desired in the ultimate product, it can be added to the powdered magnesium borid or suboxid in the proportions desired in the final product.

The other element of the thermo-electric couple consists of iron, nickel, or of other materials well known for this purpose. These other elements can be connected with the boron conductor by casting the same about one end of the boron rod, bar or sheet. A junction is maintained in a heated condition, and the free ends are cooled, as by the circulation of cold air or water, or by means and methods well known in the art. Such a couple is useful not only as a source of current, because of its strong thermo-electric properties, but also because of the rectifying action which it exerts when connected as a part of the circuit carrying current at low voltages. The thermo-electromotive force assists in impressing electromotive force in one direction and opposes it in the other direction, so that unsymmetrical current results. This characteristic makes the couple valuable for use as an asymmetric conductor in systems of wireless telegraphy and the like as described and claimed in my application, Serial No. 524,946, of even date herewith.

What I claim as new, and desire to secure by Letters Patent of the United States is:

1. A thermo-electric couple, one element of which consists essentially of boron.

2. A thermo-electric couple, one element of which is composed of boron associated with carbon.

3. A thermo-electric couple, one member of which is constructed of a fused body, consisting largely of boron.

4. A thermo-electric couple one element of which consists essentially of fused boron.

5. A thermo-electric couple one element of which consists of fused boron associated with small amounts of another element.

6. A thermo-electric couple, one element of which contains pure fused boron.

In witness whereof, I have hereunto set my hand this 26th day of October, 1909.

EZECHIEL WEINTRAUB.

Witnesses:
JOHN A. McMANUS, Jr.,
CHARLES A. BARNARD.

---

It is hereby certified that in Letters Patent No. 1,079,621, granted November 25, 1913, upon the application of Ezechiel Weintraub, of Lynn, Massachusetts, for an improvement in "Thermo-Electric Couples," an error appears in the printed specification requiring correction as follows: Page 1, line 54, for the serial number "924,947," read 524,947; and that the said Letters Patent should be read with this correction therein that the same may conform to the record of the case in the Patent Office.

Signed and sealed this 6th day of January, A. D., 1914.

[SEAL.]
J. T. NEWTON,
*Acting Commissioner of Patents.*